US005122264A

United States Patent [19]

Mohr et al.

[11] Patent Number: 5,122,264

[45] Date of Patent: Jun. 16, 1992

[54] LIQUID FUEL DISPENSING SYSTEM INCLUDING A FILTRATION VESSEL WITHIN A SUMP

[75] Inventors: Kirby S. Mohr, Tulsa County, Okla.; Thomas F. Wilson, Woodlands, Tex.

[73] Assignee: Facet Quantek, Inc., Tulsa, Okla.

[21] Appl. No.: 640,139

[22] Filed: Jan. 11, 1991

[51] Int. Cl.[5] .......... B01D 27/04

[52] U.S. Cl. .......... 210/111; 210/170; 210/172; 210/249; 210/436; 210/450; 210/497.1; 210/502.1; 220/4.14; 220/86.2; 137/234.6; 137/236.1; 137/363; 137/546; 137/565; 405/53

[58] Field of Search .......... 210/133, 170, 172, 416.4, 210/111, 249, 436, 450, 472, 497.01, 502.1; 220/4.12, 4.14, 85 S, 86.2; 137/544, 546, 234.6, 236.1, 363, 565; 405/53

[56] References Cited

U.S. PATENT DOCUMENTS

| | | | |
|---|---|---|---|
| 2,336,150 | 12/1943 | Harvath | 210/416.4 |
| 3,165,469 | 1/1965 | Bruns et al. | 210/416.4 |
| 3,294,025 | 12/1966 | Niemeyer et al. | 210/416.4 |
| 4,028,075 | 6/1977 | Roberge | 210/172 |
| 4,077,884 | 3/1978 | Naumann | 210/172 |
| 4,364,825 | 12/1982 | Connor, Jr. | 210/416.4 |
| 4,645,600 | 2/1987 | Filippi | 210/416.4 |

FOREIGN PATENT DOCUMENTS

| | | | |
|---|---|---|---|
| 2952016 | 6/1981 | Fed. Rep. of Germany | 210/416.4 |

*Primary Examiner*—Robert A. Dawson

*Assistant Examiner*—Wanda L. Millard

*Attorney, Agent, or Firm*—Head and Johnson

[57] ABSTRACT

A liquid fuel dispensing system with improved means of preventing water and particulate contamination employing an underground fuel storage tank, a pump for moving fuel from the fuel storage tank to a pump fuel outlet, an underground enclosed sump in which at least a portion of the pump is located, a filtration vessel within the sump having a fuel inlet connected to the pump fuel outlet and a fuel outlet, a filter element in the filtration vessel in series with fuel flow therethrough, the filter element having a filter media which intercepts particulate contaminants and which absorbs water to thereby prevent particulate and water contaminants from passing therethrough, a fuel shut-off device in conjunction with the filter element which is moved to the closed position when a predetermined pressure differential develops across the filter media as water is absorbed, the shut-off device serving to, upon actuation, completely block the flow of fuel through the filter element.

9 Claims, 4 Drawing Sheets

Fig. 3
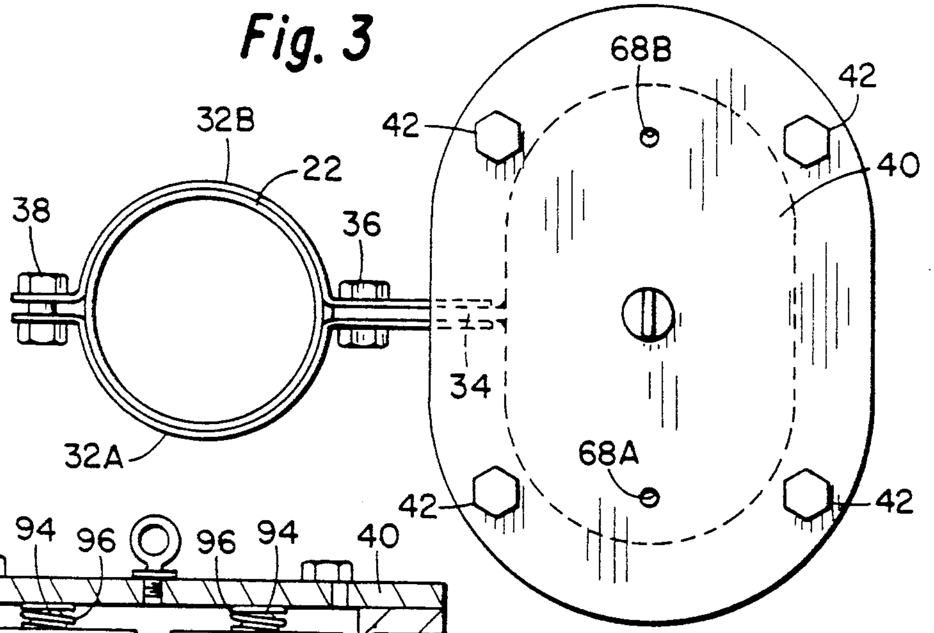
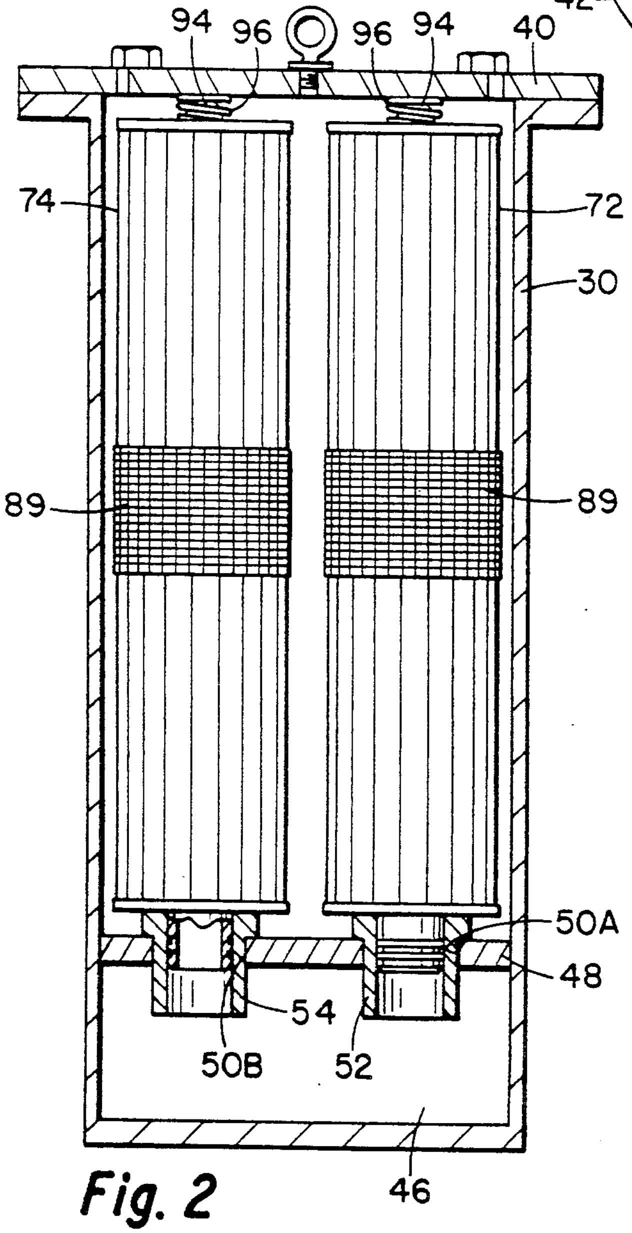
Fig. 2
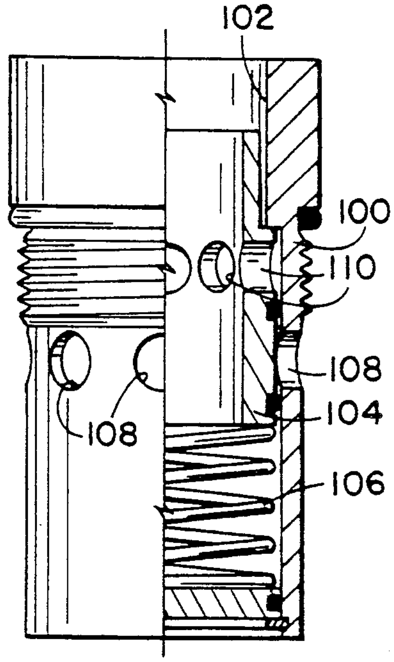
Fig. 8

LIQUID FUEL DISPENSING SYSTEM INCLUDING A FILTRATION VESSEL WITHIN A SUMP

BACKGROUND OF THE INVENTION

The most common fuels utilized in automobiles and trucks in the United States and other nations of the world are gasoline and diesel fuel. These fuels are customarily dispensed directly into vehicle fuel tanks at service stations. A dispensing system usually includes an underground storage tank where fuel is stored in large volumes. By means of a pump extending into or communicating with the storage tank, fuel is pumped on demand to an aboveground dispensing unit. The typical dispensing unit includes one or more metering system each with a flexible hose and nozzle.

Solid contaminants, such as dirt, rust, and the like, have always been a problem when it occurs in vehicle fuel. In like manner, water has also been a constant problem in fuels. However, the problem with particular and water contaminants is much more serious at the present time than in the past because of the almost universal adoption of fuel injection systems for vehicle engines. Fuel injection systems are considerably more sensitive to particulate matter than prior carbureted fuel systems. While diesel engines have always employed fuel injectors, in recent years the use of fuel injectors for gasoline engines has become common.

For these reasons, distributors of gasoline and diesel fuels have in recent years given increased attention to the requirements of clean, particulate and water free fuel. It should be pointed out that water is a continuous problem in connection with fuel. Tanks, pipelines, and so forth in which fuel is stored and/or transported are subject to condensation. Condensation is difficult to prevent and therefore accumulation of some water in stored fuel is very common. Water from spill containment manholes at fill risers is also a source of fuel contamination. In order to combat the possibility of water and/or particulate contaminants from passing into a vehicle fuel tank, service stations have empolyed the use of small canister type filters in fuel dispensing units. These canister type filters are designed to absorb water passing therethrough and intercept contaminants. In order to prevent water from being dispensed with gasoline or diesel fuel, canister filters have been devised which include an internal valve arrangement which closes off when the filter has absorbed a predetermined amount of water. For reference to a filter which functions to shut off in the event of water comtamination, reference may be had to U.S. Pat. No. 4,482,011, issued Nov. 27, 1984, entitled "Fuel Containment Monitor With A Shoutoff Valve." The prior issued patent shows the use of a ball functioning as a valve which is moved to a closed position when the pressure drop across a filter element reaches a preselected level due to the absorption of water by the filter element. The ball moves against a seat to prevent further fuel flow through the filter.

An improved canister type filter for closing against fuel flow when a predetermined amount of water has been absorbed by the filter having a valve which, after having moved to the valve closed position, is retained in such position is disclosed in co-pending U.S. patent . Ser. No. 07/393,222 entitled "Fuel Filter With Positive Water Shutoff" filed Aug. 14, 1989 and issued as U.S. Pat. No. 4,959,141 on Sep. 25, 1990.

These water absorbing and flow terminating filter elements have been successful in achieving their intended results of closing against further fuel flow in the event of the absorption of predetermined amounts of water. However, the application of such filters has been limited since they have typically been employed as canister filters attached aboveground to fuel dispensing units, and such aboveground applications are potenially envoironmentally contaminating.

The present disclosure is directed to a liquid fuel dispensing system having means for preventing inadvertent water and particular contamination which overcomes the problems and limitations with the existing systems as used in service stations today. Particularly, the disclosure herein provides a fuel dispensing system including an underground sump arrangement for receiving a filtration vessel therein and in which the filtration vessel is of a size permitting the use of relatively large filter elemments. Larger filter elements require less frequent replacement, thus reducing the atmospheric and ground water contamination that occurs with more frequent replacement of small filter elements attached aboveground directly to fuel dispensing units. Further, the disclosure herein provides an overall system of fuel dispensing wherein the pump for pumping the fuel from an underground storage tank to a fuel dispensing unit and all required filtration to intercept particulate matter and water are achieved within a confined underground sump.

Further advantages and improvements of this disclosure will be apparent from the following description.

SUMMARY OF THE INVENTION

A liquid fuel dispensing system is provided having improved means of removing water and particular contamination from the fuel. The system includes an underground fuel storage tank and a pump located in a below-ground sump for moving fuel from the fuel storage tank to a fuel dispensing unit.

Positioned within the sump is a filtration vessel having a fuel inlet and a fuel outlet. The pump has a fuel outlet that is connected to the vessel fuel inlet.

Filter elements are placed in the filtration vessel and arranged to receive fuel flow therethrough. Each filter element includes a filter media through which fuel must pass. The filter media is porous and intercepts particulate matter carried by the fuel and, further, is hydrophilic, that is, absorbs any water entrained in the fuel.

As water is absorbed in the filter media the pressure required to cause a given amount of fuel to flow therethrough increases. Each filter element includes a valve system having a ball that is held in a position so that differential pressure across the filter media is applied to the ball. When the filter media has absorbed a predetermined amount of water, the differential pressure increases to a point wherein the ball is displace and is moved against a valve seat to close the path of fluid flow through the filter element. Thus, fule flow through a filter element is terminated when the filter media has absorbed a predetermined amount of water.

The filtration vessel preferably is upright having a removable open top through which replacement filter elements may be inserted or removed. The vessel is preferably supported to a riser pipe extending from the underground storage tank.

In a preferred arrangement the filtration vessel includes a fail-safe valve that automatically closes when a filter element is removed so that flow of fuel through the vessel cannot occur in the absence of a filter element.

A further important feature of this disclosure is a filter element valve arranged so that a ball is held in position in contact with a valve seat when the ball has been moved to close the valve, so as to thereby reduce the possibility of further fuel flow through the filter element when the valve has been actuated.

The disclosure herein provides a filter vessel having means of draining the liquid therefrom and evacuation of air from the vessel to facilitate filter element change.

A better understanding of the invention will be has by reference to the following description and claims, taken in conjuntion with the attached drawings.

DESCRIPTION OF THE DRAWINGS

FIG. 2 is an elevatonal cross-sectional view of the filtration vessel taken along the line 2—2 of FIG. 1 showing details of the interior arrangement of a preferred embodiment of the filtration vessel that includes two elongated high volume filter elements in tandem arrangements.

FIG. 3 is a horizontal plan view taken along the line 3—3 of FIG. 1, showing the top of the filtration vessel and showing the riser pipe that supports the pump within the underground fuel storage tank and the means of supporting the filtration vessel to the riser pipe.

FIG. 8 is an external view, shown partially in cross-section, of a fail-safe valve element which may be employed in the filtration vessel to prevent the flow of fuel through the filtration vessel in the event a filter element is removed and is not replaced.

DESCRIPTION OF THE PREFERRED EMBODIMENTS

Figure 1:
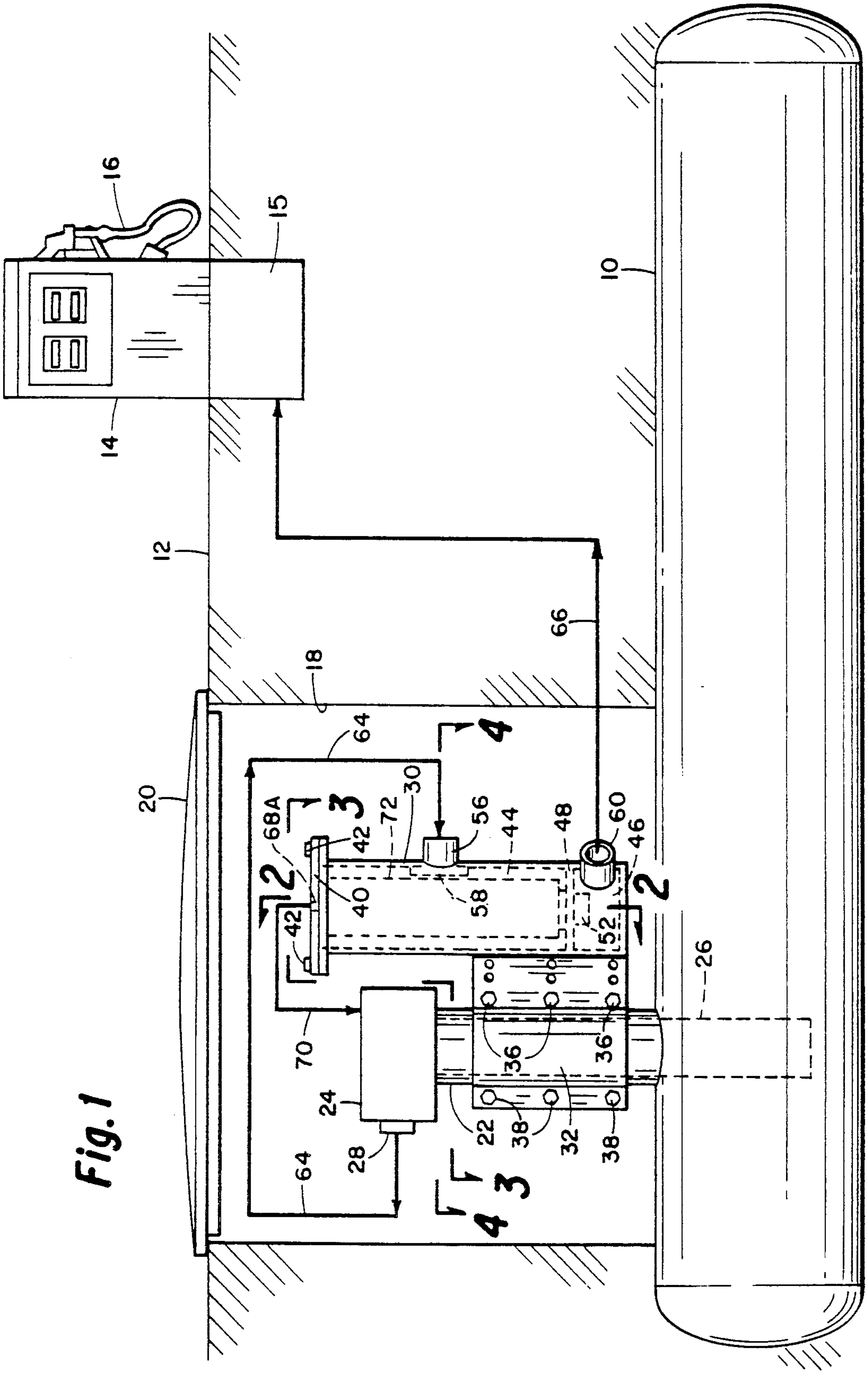
FIG. 1 is an elevational diagrammatic view of a fuel dispensing system that employs the principles of this disclosure. The system includes an underground fuel storage tank and an underground sump positioned above the storage tank. The sump/tank system is equipped with a submerged turbine pump therein for moving fuel from the tank. A filtration vessel in positioned in the sump. Fuel from the tank is pumped through the filtration vessel and then flows by way of underground piping to an aboveground fuel dispensing unit.

Referring to the drawings and first to FIG. 1, the basic components making up the liquid fuel dispensing system for service stations are shown diagrammatically. An underground storage tank 10 is commonly utilized to store liquid fuels, such as gasoline or diesel fuel for sale to vehicle owners. The tank 10 is typically buried several feet below grade surface 12 which may be a paved apron of a service station having one or more fuel dispensing units 14. Each of the dispensing units is to the type that includes a flexible hose 16 having a nozzle thereon for insertion into the filler neck of a vehicle fuel tank (not shown). The dispensing unit 14 includes mechanical and electrical apparatus for measuring the quantity of fuel delivered and for displaying the quantity and the cost thereof as well as a sump 15 therebelow which are sometimes, but not universally, employed for capturing any leaked fuel.

Positioned adjacent and preferably above tank 10 is a contaminant sump 18 illustrated out of proportion to the relative size of the submersible tank 10. Sump 18 typically is approximately three to three and one-half feet in diameter and four feet deep, and is typically lined with a deformable plastic or the like to form a substantially leak-proof enclosure. A manhole cover 20 closes the top of the sump 18 and is usually substantially flush with the grade surface 12.

A riser pipe 22, which may also be referred to as a pump riser, extends from the top of tank 10 into sump 18. Positioned at the top of the riser pipe is the head portion 24 of a pump, the lower portion 26 of the pump extending through riser pipe 22 into the interior of storage tank 10. Components 24 and 26 form a typical submersible electrically operated pump that, when energized, pumps fuel from tank 10 out a fuel outlet 28. In most service stations as they exist today, fuel outlet 28 is connected by a pipe (not shown) that extends underground to the fuel dispensing unit 14.

In the containment system of this invention, provision is made to filter the fuel from pump outlet 28 and to intercept particulate matter and water therein before the fuel is passed on to the dispensing unit 14. For this purpose, a filtration vessel 30 is employed. The vessel 30 is elongated and upright and in the preferred and illustrated embodiment is oval in cross-section, as seen in FIGS. 3 and 4.

Figure 4:
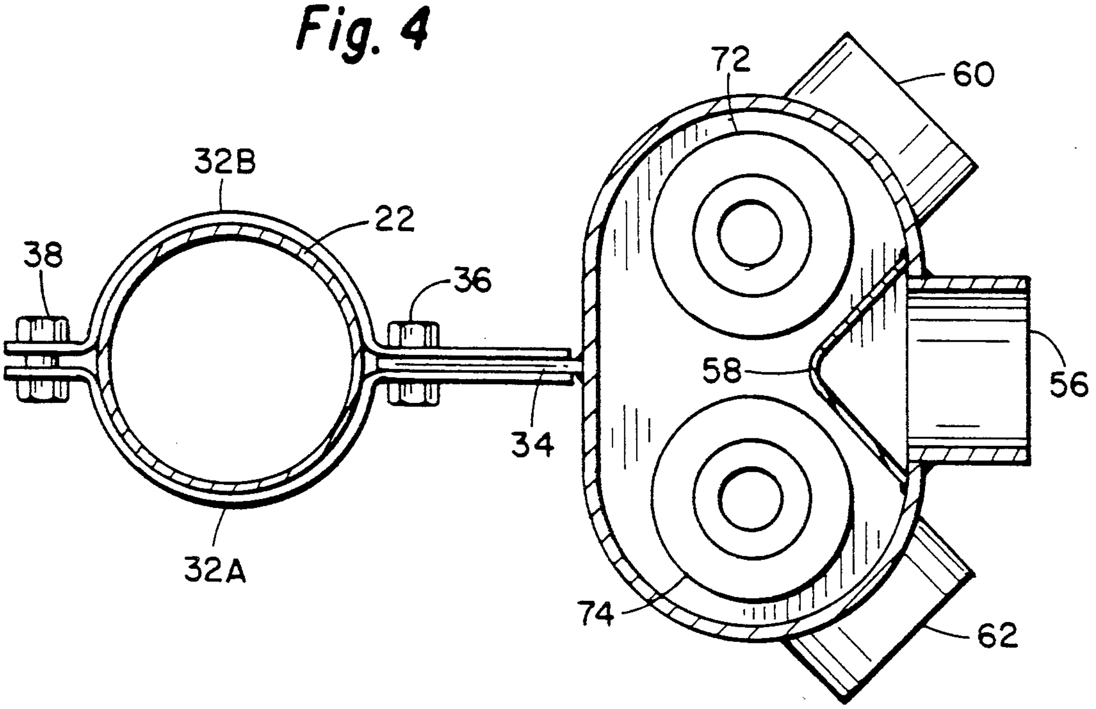
FIG. 4 is a horizontal cross-sectional view taken along the line 4—4 of FIG. 1 showing more details of the interior of the filtration vessel and the means of supporting the filtration vessel to the riser pipe.

While the filtration vessel 30 may be supported in a variety of ways, the preferred way is illustrated in FIGS. 1, 3 and 4. A mounting bracket 32 fits around riser pipe 22. The mounting bracket 32 is formed of two identical portions 32A and 32B, as seen in FIGS. 3 and 4. A vertical planar trunnion member 34 is affixed to and extends in a vertical plane from filtration vessel 30. The mounting bracket 32 is secured to the trunnion member 34 by means of bolts 36 which, in cooperation with bolts 38, serve to hold the mounting bracket 32 on the riser pipe 22. In this manner, the filtration vessel 30 is securely supported within sump 18 adjacent to pump 24, 26.

The filtration vessel 30 has an open top that is closed by a top flange 40 held in position by bolts and nuts 42.

Dividing the interior of filtration vessel 30 into an upper portion 44 and a lower portion 46 is a horizontal plate 48 having spaced apart threaded openings 50A and 50B (see FIG. 2). Received in the threaded openings are externally threaded tubular adapters 52 and 54, each of which has a finished internal cylindrical surface.

Filtration vessel 30 has a fuel inlet 56 in the sidewall thereof communicating with the interior upper portion 44. Positioned within the vessel and in line with the fuel inlet 56 is a vertical flow baffle 58 that, in horizontal cross-section (see FIG. 4), is of generally V-shaped configuration. The function of baffle 58 is to direct the flow of fuel flowing through inlet 56 toward the top and bottom of the interior of the vessel upper portion 44 so as to achieve more uniform distribution of the fuel inlet flow within the interior of the vessel 30 and avoid direct impingement of the fuel on the filter elements 72 and 74.

Filtration vessel 30 has a fuel outlet 60 communicating with the interior lower portion 46. As illustrated in FIG. 4, a second fuel outlet 62 is also employed. The provision for two fuel outlets 60 and 62 is for convenience of piping. In the arrangement illustrated in FIG. 1, only one such fuel outlet 60 is employed and in which case the second fuel outlet 62 would be plugged.

Referring back to FIG. 1, fuel delivered by pump 24, 26 from fuel outlet 28 is passed by a pipe or hose 64 to filtration vessel fuel inlet 56. Fuel flows out of filtration vessel 30 through outlet 60 and by underground piping 66 to fuel dispensing unit 14. In the typical fuel distribution system that presently exists, piping 66 is normally connected directly to the pump fuel outlet 28; however, in the system of this disclosure, a filtration and water containment system is inserted between pump 24, 26 and dispensing unit 14 in the form of filtration vessel 30 and the contents thereof.

Before discussing the filtration and water interception system contained within filtration vessel 30, one other feature illustrated in FIG. 1 needs to be described and that is the provision for venting the interior of the filtration vessel 30. As seen in FIG. 3, there is formed in top flange 40 small threaded vent holes 68A and 68B. Referring again to FIG. 1, piping 70, which preferably is a small diameter flexible hose, is attached at one end into vent hole 68A and at the other end to the interior of pump head portion 24. Piping 70 is attached to pump portion 24 where the fluid pressure is less than the pressure at the fuel outlet 28. When one vent hold 68A is utilized, the other is closed. The function of the vent hold 68A and piping 70 is to ensure that air or vapor is not trapped within the interior of filter vessel 30 and that, at all times during the operation of the system, the filter vessel 30 is completely filled with fuel.

As previously stated, the function of the filter system contained within the filtration vessel 30 is to intercept particulate matter and water, and to guard against the possibility of movement of fuel containing either suspended solid materials or water to dispensing unit 14. For this reason, as shown in FIGS. 1 and 4, two filter elements, indicated generally by the numerals 72 and 74, are employed. For a better understanding of the filter elements, reference will now be had specifically to FIGS. 5, 6, and 7.

Figure 5:
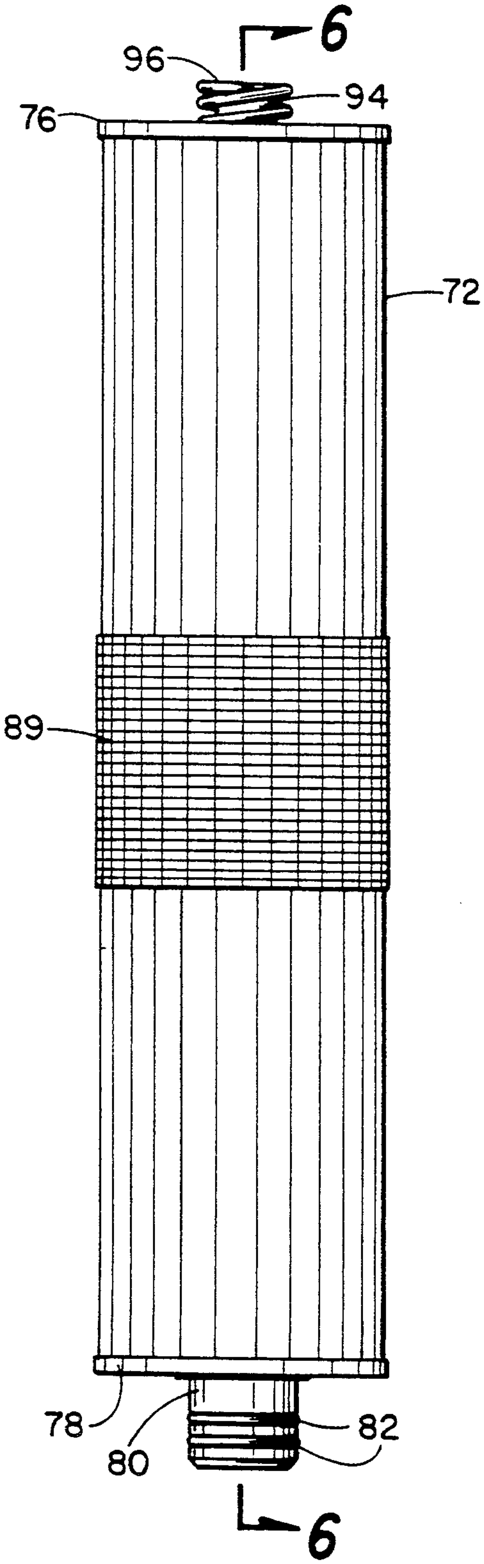
FIG. 5 is an external view of a filter element as employed in the filtration vessel of FIG. 1.

FIG. 5 is an external view of a filter element 72, it being understood that the elements 72 and 74 are identical and interchangeable. Filter element 72 is of elongated vertical, cylindrical external configuration having a top end cap 76 and a bottom end cap 78. Bottom end cap 78 supports a tubular coupling member 80 having O-rings 82 on the external cylindrical surface thereof. The tubular coupling member 80 is dimensioned to be telescopically and sealably received in a tubular adapter 52 or 54 supported in filtration vessel 30 and to thereby provide communication between the interior of the filter element 72 and the filtration vessel lower interior portion 46.

Tubular coupling member 80 has a reduced internal diameter circumferential seat area 84 for purposes to be described subsequently.

Figure 7:
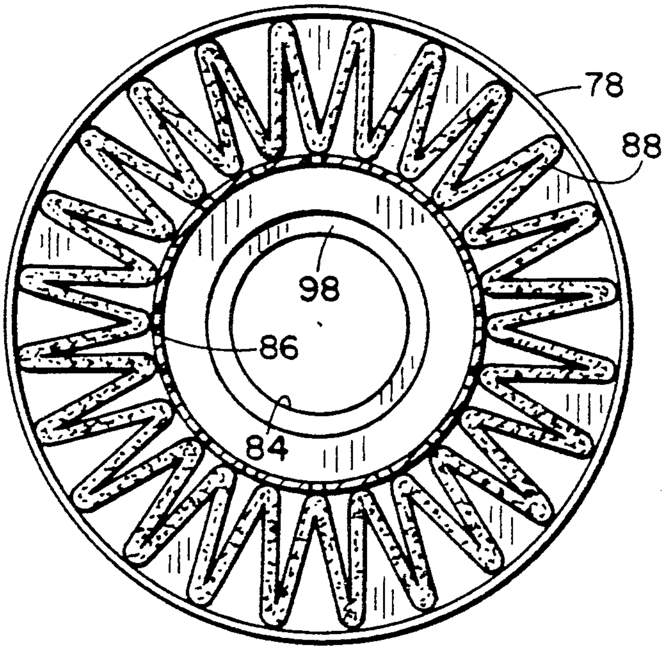
FIG. 7 is a horizontal cross-sectional view of the filter element as taken along the line 7—7 of FIG. 6 showing the valve ball in the closed position.

The top end cap 76 and bottom end cap 78 are secured to an internal perforated tube 86 which is of stiff material, such as metal. Formed on the external surface of tube 86 is filter media 88 which may be in the form of a pleated sheet, as shown in FIG. 7. The use of a pleater filter media 88 is by way of example, and it is understood that the filter media 80 may be of a type wound directly on tube 86 or any other of the known constructions utilized for forming filter elements. The use of a pleated element 88 is preferred since it provides a greatly increased external surface area compared to most other configurations.

Top end cap 76 has an opening therethrough co-axial with tubular member 86. The top end cap 76 receives a washer member formed of a plurality of washers and specifically a first washer 90 and a second washer 92. Each of the washers 90 and 92 includes a large opening therethrough.

Positioned in engagement with washers 90 and 92 is a ball 94. The washer members 90 and 92 are of deformable material, such as relatively thin aluminum or other material having similar characteristics. The internal diameter of the washers 90 and 92 is carefully selected in relationship to the diameter of ball 94.

A coil spring 96 is received in the top end cap 76. When top flange 40 is bolted onto filtration vessel 30, as shown in FIG. 2, spring 96 is compressed to thereby retain filter element 72 in position and to secure engagement with tubular adaptor 52 or 54 in which it is positioned. Spring 96 is of internal diameter larger than ball 94 so the ball is loosely retained within the spring.

Filter media 88 is formulated so as to intercept solid particles that might be suspended in the fuel passing through the filtration vessel 30 and to this extent functions in the normal way of fuel filter. However, the filter media 88 has a second and highly important function, that is, the filter media 88 is of the hydrophilic type, that is, it readily adsorbs any water entrained in the fuel. It is well known that water and hydrocarbon fuel, such as gasoline or diesel fuel, are immiscible, that is, water does not dissolve in hydrocarbon fuels of these types nor do hydrocarbon fuels dissolve in water.

A band 89 in the form of a cartridge screen is secured around the external middle portion of filter media 88 as a reenforcement to prevent undue swelling when the filter media adsorbs water. When water encounters filter element 88, it is absorbed by the filter element and is thereby restrained from passing through the filter element. As the filter element absorbs contaminants and particularly as it absorbs water, the ability of the filter element to pass fuel therethrough gradually decreases. As the resistance to the passage of fuel increases, the pressure drop across the filter element 88 increases. This pressure drop is applied to ball 94 which, as it seats against washers 90 and 92, prevents fuel flow through the filter element, except as the fuel passes through filter element 88. When the differential pressure reaches a preselected level, determined by the characteristics of the washers 90 and 92, ball 94 passes through the washers and into the interior of tube 86. The flow of fuel immediately moves the ball into contact with seat 84 formed as a part of a tubular coupling member 80, thereby closing against any further fuel flow through the filter element. When both filter elements 72 and 74 are closed, as the ball 94 in each moves to the seated position, fluit flow through filtration vessel 30 is blocked. This action ensures that fuel will not flow from underground tank 10 to fuel dispensing unit 14 if water exists in the fuel to the extent that it has blocked filter elements 72 and 74. Closing off of fuel flow ensures that fuel will not be delivered having water or solid contaminants.

For information relating to the composition of filter media 88 having the ability to absorb water, reference may be had to U.S. Pat. No. 4,787,949 entitled: "Method Of Manufacturing Highly Water Absorbent Pleated Filter Laminate," which is incorporated herein by reference.

Figure 6:
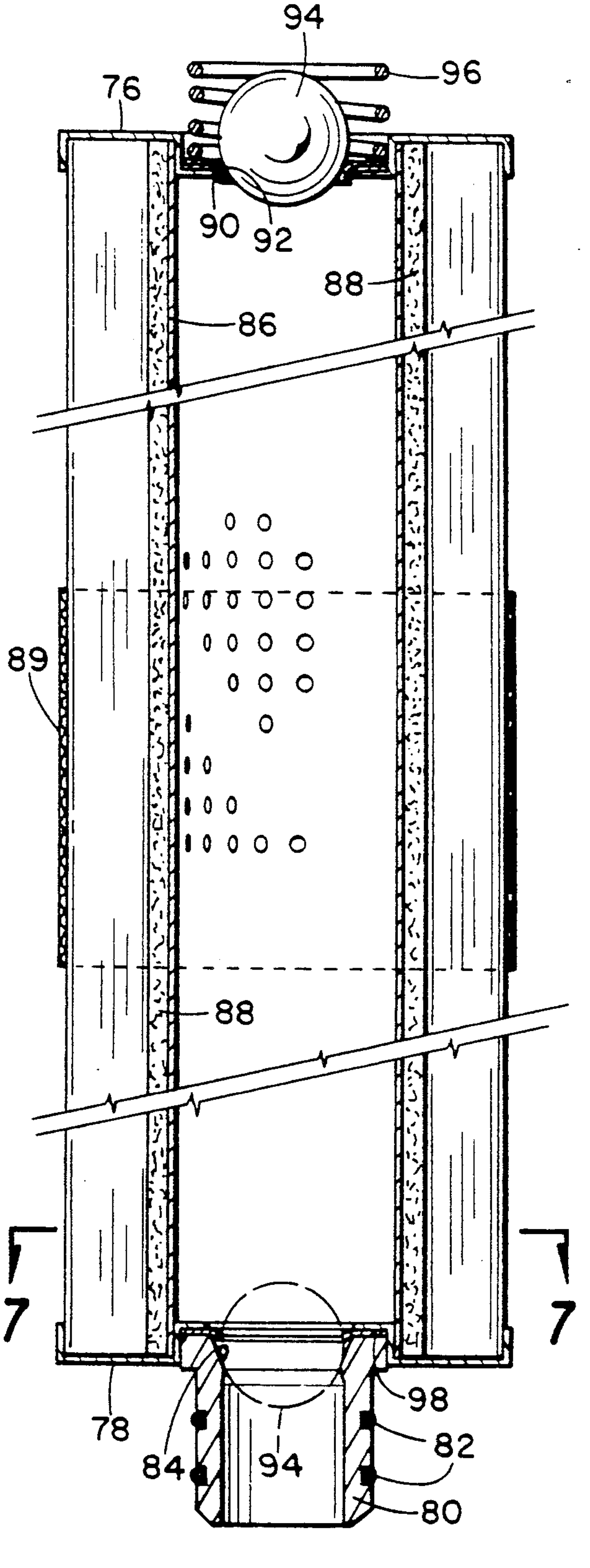
FIG. 6 is an elevational enlarged, fragmented cross-sectional view taken along the line 6—6 FIG. 5 showing details of the interior arrangement of the filter element.

As seen best in FIG. 6, positioned between the tubular coupling member 80 and the end cap 78 is a washer 98 having a large diameter hole therein which is normally slightly smaller than the diameter of ball 94. When the ball passes through washers 90 and 92, fuel flow immediately causes the ball to impinge upon washer 98 and to deform and to pass through it and into engagement with seat 84. The ball is shown in dotted outline in FIG. 6. Washer 98 is deflected by the force of fluid pressure to allow the ball to pass therethrough. Washer 98 is positioned such that the ball, after it has passed through, is held in contact with or at least immediately adjacent to seat 84. This action prevents the ball from being displaced away from the seat to prevent the possibility of fuel having water or solid contaminants from passing out of filtration vessel 30.

Washers 90 and 92 may be, and preferably are, predeformed in the process of manufacturing the filter elements so as to permit ball 94 to pass therethrough in the presence of an accurately preselected differential pressure.

FIG. 8 shows an alternate design for adapters 52 and 54 in the form of an adaptor 100 which is tubular and externally threaded to be received in threaded openings 50A or 50B formed in the filtration vessel plate 48. Adapter 100 has an internal upper cylindrical surface 102 to telescopically and sealably receive the tubular coupling member 80 of a filter element. Positioned within the interior of the adaptor 100 is a tubular valve element 104 held in an upper position by spring 106. The adaptor 100 has a plurality of radially directed outlet passages 108 and in like manner, the tubular valve element 104 has outlet passages 110. Outlet passages 110 and 108 are held out of communication by spring 106 until tubular element 104 is displaced downwardly, compressing spring 106. This is accomplished when a tubular coupling member 80 of a filter element is inserted into the upper cylindrical surface 102 of the adaptor.

Special adapter 100 is a fail-safe device to ensure that a workman cannot remove filter elements 72 and 74, reinstall the flange plate 40, and then expect to obtain fuel delivered from the underground tank to fuel dispensing unit 14. While the use of such special adapters 100 has been employed in other filtration apparatus the employment herein in combination with the other features of the service station containment system provides an additional safety factor to prevent inadvertent passage of fuel having solid particulate or water contaminants into vehicle fuel tanks.

The system which has been described has many advantages over existing techniques for preventing particulate and water contamination in vehicle fuel. While the use of a drain line substantially reduces the probability of hydrocarbon release, nevertheless, containment sump 18 for filtration vessel 30 ensures that in the process of replacing filter elements fuel is not inadvertently discharged into the environment. Instead, any fuel spillage is contained within sump 18 where it can be removed. The use of a filtration vessel 30 having multiple filter elements is highly advantageous in that it substantially prolongs the time between the filter element replacement.

While the liquid fuel dispensing system of this disclosure has been illustrated and described as it particularly relates to dispensing fuel at a service station for fueling cars or trucks, it is understood that the system is not so limited, and in addition may be utilized for other fuel dispensing applications, such as at marine fueling points.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A liquid fuel dispensing system comprising:
- a fuel dispensing unit mounted above grade level;
- an underground fuel storage tank;
- an underground sump placed adjacent and elevationally above said underground fuel storage tank;
- a pump means for moving fuel from said fuel storage tank and having a pump fuel outlet;
- a filtration vessel mounted within said underground sump having a fuel inlet and a fuel outlet, said pump means outlet being connected to the filtration vessel fuel inlet;
- filter means in said filtration vessel and in series with fuel flow therethrough, the filter means comprising means to intercept contaminants; and
- piping means for conducting fuel from said filtration vessel to said fuel dispensing unit.

2. A liquid fuel dispensing system according to claim 1 including:
- a riser pipe extending vertically from said underground storage tank into said sump, at least a portion of said pump means being affixed to said riser pipe.

3. A liquid fuel dispensing system according to claim 2 including means to support said filtration vessel to said riser pipe within said sump.

4. A liquid fuel dispensing system according to claim 3 including:
- bracket means affixed to said riser pipe within said sump, said bracket means being attached to said filtration vessel to provide said means to support said filtration vessel within said sump.

5. A liquid fuel dispensing system according to claim 1 wherein said filter means includes means to close against further fuel flow upon the absorption of a predetermined quantity of contaminants.

6. A liquid fuel dispensing system according to claim 5 wherein said filter means comprises:
- a tubular filter element through which fuel freely passes but which intercepts particulate matter and absorbs water, the filter element having a first end and a second end;

a first end cap sealably secured to said tubular filter element first end and having an opening therethrough;

a washer member of thin deformable material having an opening therethrough, the washer being secured to said first end cap coaxially with said opening therethrough;

a ball normally in engagement with said washer member, the ball having a diameter greater than the internal diameter of said washer member and thereby serving to close flow through the first end of said tubular filter element;

a second end cap sealably secured to said second end of said tubular filter element and having an opening therethrough;

an internal annular seat formed in said second end cap in closed communication with said opening therethrough, the seat being closed to fuel flow therethrough when engaged by said ball; and means to removably sealably engage said second end cap with said filtration vessel fuel outlet, and wherein said washer member is deformable to permit said ball to pass therethrough when a predetermined pressure drop develops across said tubular filter element to thereby engage said seat member to block further flow through said filtration vessel.

7. A liquid fuel dispensing system according to claim 1 wherein said filtration vessel has a vapor outlet and including:

piping means providing communication between said filtration vessel vapor outlet and said pump.

8. A liquid fuel dispensing system according to claim 1 wherein said filtration vessel is upright and includes an interior horizontal plate providing an interior upper and an interior lower chamber, said fuel inlet communicating with said interior upper chamber and said fuel outlet with said interior lower chamber, said plate having an opening therethrough receiving a vertical tubular adaptor, and wherein said filter means comprises an elongated vertical cartridge having a tubular fuel outlet removably telescopically received in said adaptor.

9. A liquid fuel dispensing system according to claim 1 wherein said filtration vessel has a plurality of fuel outlets, any one of which may receive said piping for conducting fuel to said fuel dispensing unit.

* * * * *